US010896158B2

(12) United States Patent
Tucker et al.

(10) Patent No.: US 10,896,158 B2
(45) Date of Patent: Jan. 19, 2021

(54) SYSTEMS AND METHODS FOR MANAGING AND UPDATING AN INTERNAL PRODUCT CATALOG

(71) Applicant: Walmart Apollo, LLC, Bentonville, AR (US)

(72) Inventors: Benjamin Tucker, Bella Vista, AR (US); Jimmie Bond, Rogers, AR (US); Kenneth Clark, Bella Vista, AR (US); David Terjak, Cave Springs, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 111 days.

(21) Appl. No.: 15/956,106

(22) Filed: Apr. 18, 2018

(65) Prior Publication Data

US 2018/0308145 A1    Oct. 25, 2018

Related U.S. Application Data

(60) Provisional application No. 62/487,242, filed on Apr. 19, 2017.

(51) Int. Cl.
*G06F 16/20* (2019.01)
*G06Q 30/00* (2012.01)
(Continued)

(52) U.S. Cl.
CPC .............. *G06F 16/20* (2019.01); *G06F 16/11* (2019.01); *G06Q 30/0601* (2013.01); *G06Q 30/0603* (2013.01); *G06Q 30/0625* (2013.01)

(58) Field of Classification Search
None
See application file for complete search history.

(56) References Cited

U.S. PATENT DOCUMENTS 4,984,155 A    1/1991 Geier et al.
6,959,286 B2   10/2005 Perkowski
(Continued)

FOREIGN PATENT DOCUMENTS

WO    WO 1993/004449 A1   3/1993
WO    WO 2015/065260 A1   5/2015

OTHER PUBLICATIONS

"Cui, Z, An ontology-based approach to eCatalogue Management", Oct. 2003, BT Technology Journal, vol. 21, No. 4, pp. 76-82 (Year: 2003).*

*Primary Examiner* — William J Allen
*Assistant Examiner* — Maria S. P. Heath
(74) *Attorney, Agent, or Firm* — Patterson Thuente Pedersen, P.A.

(57) ABSTRACT

A system for managing and updating an internal product catalog, including an internal product catalog database, at least one external product catalog database, and an application program interface. The internal product catalog database includes a plurality of existing item files in which each existing item file is associated with a product and includes at least one attribute of the product. The at least one external product catalog database includes a plurality of external item files in which each external item file is associated with a product and includes at least one attribute of the product. The application program interface is communicatively coupled with the internal product catalog database and the at least one external product catalog database. The application program interface is configured to accept a user search request to search for a new product in which the user search request includes at least one attribute of the new product.

16 Claims, 5 Drawing Sheets

(51) Int. Cl.
    *G06Q 30/06*     (2012.01)
    *G06F 16/11*     (2019.01)

(56) References Cited

U.S. PATENT DOCUMENTS

| | | |
|---|---|---|
| 2003/0093333 A1 | 5/2003 | Veeneman |
| 2004/0139001 A1 | 7/2004 | Henriques et al. |
| 2007/0118441 A1* | 5/2007 | Chatwani ............ G06Q 30/0603 705/27.1 |
| 2010/0278439 A1* | 11/2010 | Lennington ........ G06K 9/00624 382/209 |
| 2013/0117269 A1* | 5/2013 | Sacco ................... G06F 16/583 707/740 |
| 2013/0124361 A1 | 5/2013 | Bryson |
| 2013/0173402 A1 | 7/2013 | Young |
| 2014/0207591 A1* | 7/2014 | Acker, Jr. .......... G06Q 30/0633 705/21 |
| 2015/0127430 A1* | 5/2015 | Hammer, III ...... G06Q 30/0623 705/7.35 |
| 2016/0328782 A1* | 11/2016 | Bhojwani ............... H04L 67/10 |

\* cited by examiner

SYSTEMS AND METHODS FOR MANAGING AND UPDATING AN INTERNAL PRODUCT CATALOG

RELATED APPLICATION

The present application claims the benefit of U.S. Provisional Application No. 62/487,242 filed Apr. 19, 2017, which is hereby incorporated herein in its entirety by reference.

TECHNICAL FIELD

The present disclosure relates generally to a retail product catalog, and more particularly, to a system including a mobile retail application that allows buyers or store associates to efficiently search and submit draft product data into a product catalog, as well as related systems and methods.

BACKGROUND

For retailers with a significant number of products or locations, obtaining information related to existing products and compiling new product offerings in an efficient way can be challenging.

For example, buyers for a retailer may regularly travel on buying trips to survey new products and competing products at trade shows, competitor stores, and supplier offices. Individual buyers may be tasked with writing down product details manually in a notepad or offline in a spreadsheet or laptop. This manual entry method results in inconsistency, missed details, and potential overlap with existing product acquisitions. In some cases, a product may not be sold in stores, but online only, and a product catalog may not provide visibility to these product details while a buyer is on a buying trip.

In other examples, local retailers of a multi-location corporate retailer may carry a number of local product offerings that have circumvented the corporate supplier on-boarding process. This can make the item available only in the specific store location where the item originated. While visibility of such local product offerings is desirable to buyers and others in the corporation, adding these local product offerings to a retailer's existing internal database can be an inefficient and time-consuming manual entry process.

Therefore, there is a need for a system or method that can efficiently obtain information related to existing products, incorporate new product information to an internal corporate database, and incorporate existing local product offerings to an internal corporate database, so that increased online visibility of a corporate retailer's product offerings and potential product offerings is made possible.

SUMMARY

Embodiments relate to systems and methods for managing and updating an internal product catalog.

In an embodiment, a system for managing and updating an internal product catalog includes an internal product catalog database, at least one external product catalog database, and an application program interface. The internal product catalog database includes a plurality of existing item files, each existing item file associated with a product and comprising at least one attribute of the product. The at least one external product catalog database includes a plurality of external item files, each external item file associated with a product and comprising at least one attribute of the product. The application program interface is communicatively coupled with the internal product catalog database and the at least one external product catalog database. The application program interface is configured to accept a user search request to search for a new product, in which the user search request includes at least one attribute of the new product. The application program interface is configured to facilitate a search of both the internal product catalog database and the at least one external product catalog database based on the user search request. If search results are found, the application program interface presents the search results and accepts a selection of a search result to pre-populate a new item file, or if no search results are found, the application program interface presents a setup form for a new item file. The application program interface is configured to save the new item file as a draft new item file in the internal product catalog database.

In one embodiment, a method of managing and updating an internal product catalog is disclosed. The method includes accepting a user search request to search for a new product, in which the user search request includes at least one attribute of the new product. The method includes searching both an internal product catalog database and at least one external product catalog database based on the user search request. If at least one search result is found, the method includes presenting the at least one search result and accepting a selection of one of the at least one search result to pre-populate a new item file. If no search results are found, the method includes presenting a setup form for a new item file. The method includes saving the new item file as a draft new item file in the internal product catalog database.

Some embodiments include bar-code scan-based and text-based searches of internal and external product catalogs to retrieve and consolidate results in a mobile application.

Some embodiments include the ability to create a new item file for a product in an internal product catalog via mobile application.

Some embodiments include the ability to collect images for a product in an internal product catalog database.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

Figure 1:
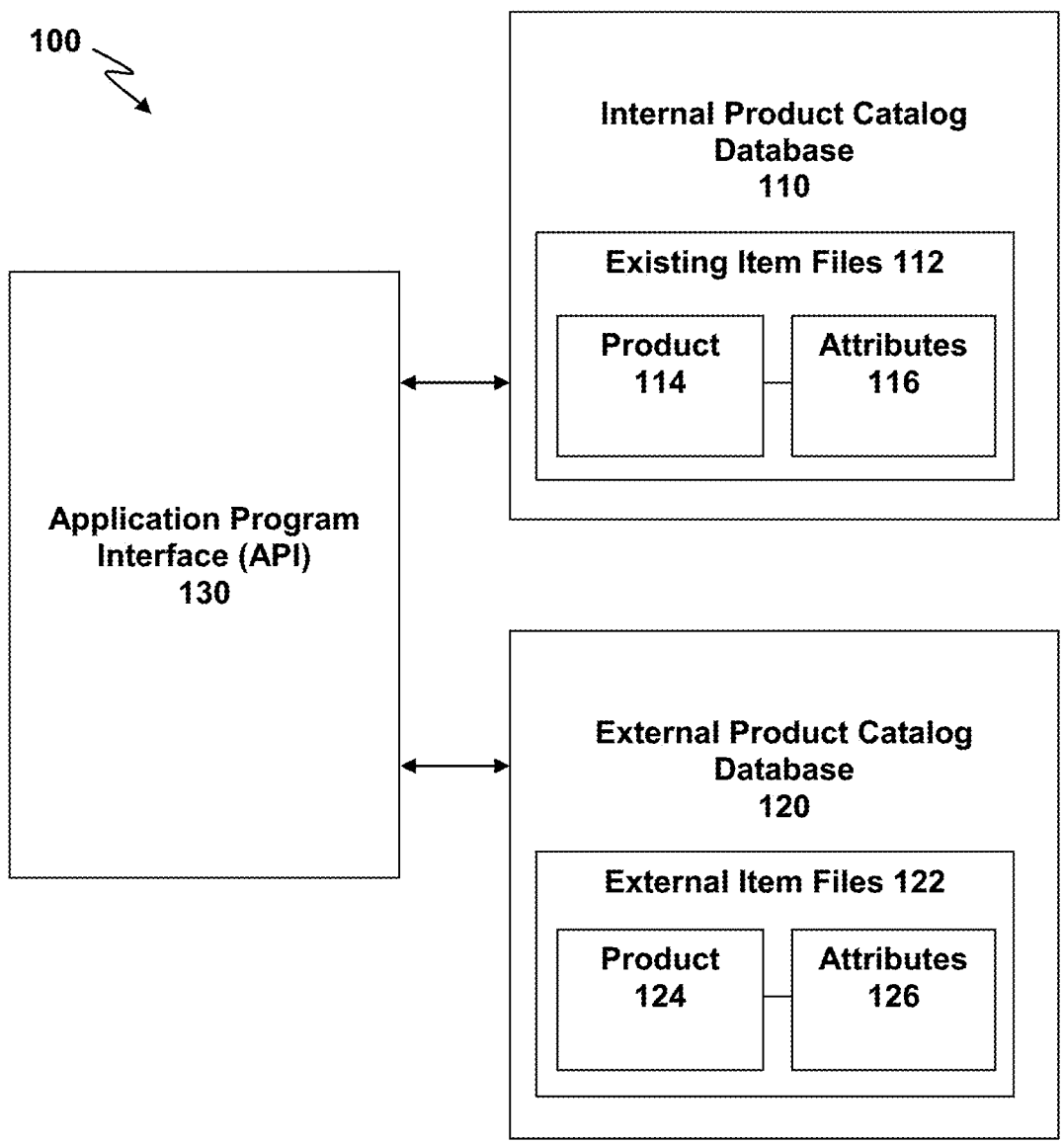
FIG. 1 is a block diagram of a system for managing and updating an internal product catalog according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a block diagram of a system 100 for managing and updating an internal product catalog is depicted, according to an embodiment. System 100 generally comprises an internal product catalog database 110, an external product catalog database 120, and an application program interface (API) 130.

Embodiments of system 100 can be performed in cloud computing, client-server, or other networked environment, or any combination thereof. The components of system 100 can be located in a singular "cloud" or network, or spread among many clouds or networks. End-user knowledge of the physical location and configuration of components of system 100 is not required.

As will be described, system 100 and/or their components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but also to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In embodiments, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Internal product catalog database 110 and external product catalog database 120 can each comprise one or more databases. A database is a structured set of data held in a computer device, such as a server. Database software provides functionalities that allow building, modifying, accessing, and updating both databases and the underlying data. Databases and database software reside on database servers. Database servers are collections of hardware and software that provide storage and access to the database and enable execution of the database software.

In embodiments of system 100, the database servers for internal product catalog database 110 and external product catalog database 120 can be local (e.g., located in or associated with a particular retail home office, store or other location) or distributed (e.g., associated with one or more retail stores, locations or corporations), and/or the database servers or databases themselves can be cloud-based. As an example, databases 110 and 120 are accessed by or relied upon by various components of system 100 and can be present on a single computing device in an embodiment. In other embodiments, one or more databases 110 and 120 can be present on one or more database systems physically separate from one another. In one particular example, databases 110 and 120 comprise one or more SQL or other relational databases.

Referring to FIG. 1, internal product catalog database 110 includes a plurality of existing file items 112 which are each associated with a particular product 114. Further, each of the existing file items 112 includes one or more attributes 116 of the associated product 114. Attributes 116 may include any number of pieces of information associated with a product 114. Attributes 116 can include, for example: a Universal Product Code (UPC), a bar code, a Quick Response (QR) code, a radio frequency identification (RFID) identifier, a product title, a product number, a product brand, a product long description, a product department, a product dimension, a product keyword, a manufacturer suggested retail price (MSRP), a product cost, a product Uniform Resource Locator (URL), or a product image.

External product catalog database 120 includes a plurality of external file items 122 which are each associated with a particular product 124. Further, each of the external file items 122 includes one or more attributes 126 of the associated product 124. Attributes 126 may include any number of pieces of information associated with a product 124. Similarly to attributes 116, attributes 126 may include, for example: a Universal Product Code (UPC), a bar code, a Quick Response (QR) code, a radio frequency identification (RFID) identifier, a product title, a product number, a product brand, a product long description, a product department, a product dimension, a product keyword, a manufacturer suggested retail price (MSRP), a product cost, a product Uniform Resource Locator (URL), or a product image. External product catalog 120 can include information related to a product that may not be available internally, but has already been collected elsewhere, as in the case of many external APIs, for example.

As shown in FIG. 1, the API 130 is communicatively coupled with the internal product catalog database 110 and at least one external product catalog database 120. In general, API 130 allows internal associates the ability to submit draft product data into a corporate product catalog for further elaboration later. For example, a user may scan the bar-code of a product or enter text-based search criteria to a mobile application. API 130 will facilitate a search on an internal product catalog found on the internal product catalog database 110 to retrieve products that may already exist elsewhere in the enterprise. API 130 will also perform an external product catalog search found on at least one external product catalog database 120 to retrieve results that may not be available internally but have already been collected elsewhere.

If results are found via API 130, the results are displayed for the user to select from to pre-populate a product setup form including associated attributes 116 or 126. If no products are found, the user may proceed to an empty product setup form. Once in the product setup form, the user enters basic information pertaining to the intended use of the product. For a buyer on a buying trip collecting product information, this can include some basic product information to adequately inform the buying and quote process if they choose to take the product forward. Attributes 116 or 126 may include a wide variety of product information, as mentioned above, and may include images based on product photos. Specifically, a user can take photos of a product which will be uploaded and converted to product URLs to also store in the internal product catalog database. These images may be retrieved later to help better inform the buying process as well. In the case of store associates entering a local supplier item, similarly or in addition to retrieving the above attributes 116 or 126, the API 130 can be used to collect additional product attributes needed for receiving the product, such as cost and dimensional data.

Once the required product setup form, including product attributes 126, has been completed, the user submits the information for further review. At this point, the information is pushed to the internal product catalog and saved in a draft state to be retrieved and elaborated on later. For buyers on a buying trip, this means that the data can be retrieved in the buyer line review and quotes can be solicited once the buyer is back at the home office. For store associates uploading local product information, this means the item is made visible at the home office level. This reduces duplication in each local store item file. Accordingly, each new store carrying the same product can simply retrieve the information already available in the internal product catalog and associate their store to it. It also makes the product available in the internal product catalog so that it may be considered for buying at the corporate level. This permits widening the scope of product distribution and online visibility.

In some embodiments, searching may include image recognition. This may be useful, for example, in cases when the product does not have a recognized bar code.

In some embodiments, other functionality may be present on the mobile application, including management of the workflow process. In these embodiments, buyers and other internal users can check on the status of their products in the buying process and manage approval and error tasks directly from the mobile application.

Figure 2:
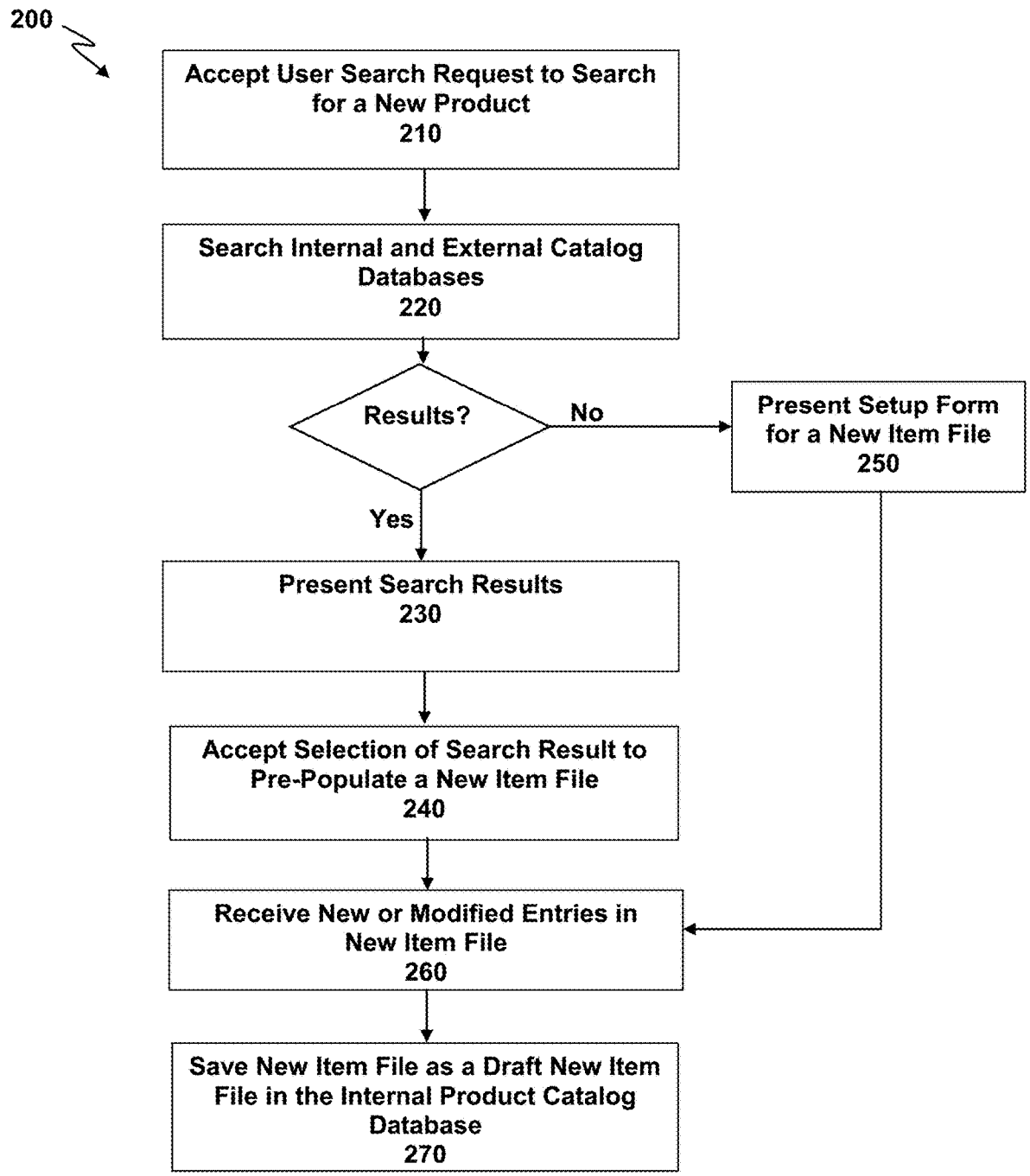
FIG. 2 is a block diagram of a method for managing and updating an internal product catalog according to an embodiment.

FIG. 2 sets forth a method 200 for managing and updating an internal product catalog. The API 130 is generally configured to perform these steps. As shown with respect to method 200 in FIG. 2, the API 130 first accepts a user search request to search for a new product at 210. In general, the user search request includes at least one attribute 116 or 126 of the new product 114 or 124.

Next, at 220, the API 130 facilitates a search of both the internal product catalog database 110 and the at least one external product catalog database 120 based on the user search request. In some embodiments, at least one attribute 116 or 126 of the new product provided in the user search request comprises an image of the new product, and the API 130 is configured to use one or more image recognition techniques to facilitate the search of both the internal product catalog database 110 and the external product catalog database(s) 120 using the image. In some embodiments, the API 130 is communicatively coupled with a camera that is the source of the image of the new product. In some cases, the API 130 resides on a mobile device having a camera, such as a smartphone, a tablet computing device, a laptop computing device, an augmented reality device, or a wearable electronic device.

If search results are found, the search results are presented to the user at 230. Next, at 240, the user selects one of the search results which is, accordingly, accepted by the API 130. This selection pre-populates a new item file. In the case that no search results are found, the API 130 presents a setup form for a new item file, at 250. In some embodiments, the API 130 is also configured to pre-populate the setup form with at least one attribute of the next product of the user search request if no search results are found as well. At 260, a user can enter, and the API can receive new entries into a new item file or entries can be modified or added into a pre-populated new item file. At 270, the API 130 saves the new item file as a draft new item file in the internal product catalog database. Accordingly, the draft new item file is then searchable as part of the internal product catalog database, in various embodiments. In some cases, the API 130 is configured to accept data from a local item file for a new item file.

In some embodiments, the API 130 includes a user interface configured to accept the user search request, present the search results and accept the selection of a search result to pre-populate the new item file, and present the setup form for a new item file.

Figure 3:
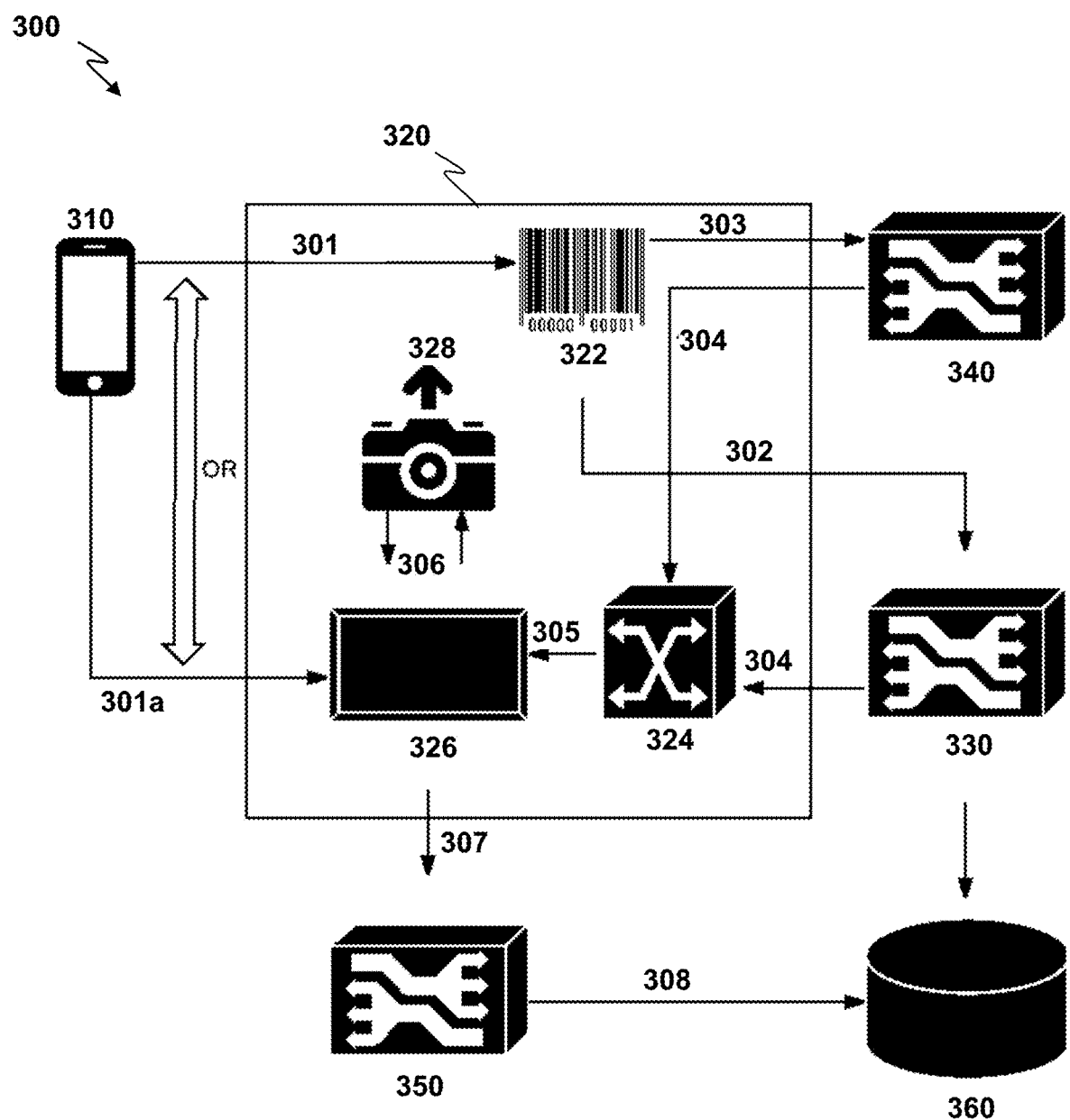
FIG. 3 is a diagram of an example system for managing and updating an internal product catalog according to an embodiment.

Referring to FIG. 3, a diagram of an example system for managing and updating an internal product catalog is shown. This example embodiment generally includes a mobile user 310, mobile product setup app 320, internal product search API 330, external product search API 340, product creation API 350 and internal product database 360. Mobile product setup app 320 is shown comprising a bar-code/text search 322, search results consolidator 324, product setup form 326, and image upload 328.

In various embodiments, the mobile product setup app 320, the internal product search API 330, external product search API 340, and product creation API 350 may collectively comprise an API 130, as referenced in FIG. 1. In general, FIGS. 1-3 and their related features can be understood as describing the same features in different or supporting ways.

Referring to FIG. 3, system 300 generally includes a mobile user 310 that logs into a mobile product setup app 320 on a mobile device such as a smartphone, a tablet computing device, a laptop computing device, an augmented reality device, or a wearable electronic device. The mobile user 310 can represent a variety of users of the system 300, including at least the following two cases: In a first case, the mobile user 310 is a buyer on a buy trip. The functionality provided by the system allows a mobile user 310 to search for items while on the buy trip and provide information related to the item back to the internal product database to begin the buying process. In a second case, a mobile user 310 is a store associate who has acquired a product via a local vendor and wishes to provide basic product information to the internal product database for use in other local stores and as a potential buy in a greater regional setting.

At 301, a mobile user 310 searches for a product in question using elastic search criteria including but not limited to the GTIN or UPC as well as various product descriptions and brands. These are generally barcode/text searches 322. Alternate text or image-based searches could be possible as well.

At 302, the mobile product setup app 320 first calls the internal product search API 330. The internal product search performs an elastic search on product information in the internal product catalog database 360 containing all products found either online or in store. In various embodiments, internal product catalog database 360 corresponds to database 120 of FIG. 1.

At 303, if the product is not found internally, the system 300 triggers a search via the external product search API 340. This external product search API 340 searches one or more external product catalogs to determine if any product information exists elsewhere. In various embodiments, external product catalog databases correspond to databases 120 of FIG. 1.

At 304, if results are found via the internal search (using internal product search API 330) or external search (using external product search API 340), the results are returned to the mobile product setup app 320 for consolidation at search results consolidator 324. Search results consolidator 324 permits enriched product information to be displayed to the mobile user 310. The mobile user 310 is then given the option to select the correct product from the search results if more than one is returned.

At 305, once the product is selected, a product setup form 326 for a new item file is provided, including one or more pre-populated fields, based upon product selection. The user fills out the additional product details in the product setup form 326 pertinent to informing buying decisions or for use in displaying content online. Various product attributes may be captured at this stage including product name, product description, brand, manufacturer name as well as additional category and sub-category-specific information, for example.

Alternatively, in certain cases 301a, the mobile user 310 may proceed directly to entering information in the product setup form 326 from the start, rather than by proceeding through the internal and external searching described. This abbreviated process may be useful at times when it is known that the internal and external searching will not be useful in appropriately identifying or populating a product being uploaded.

At 306, the mobile user 310 may elect to associate one or more images to the product via image upload 328. The product entry form 326 provides the ability to attach primary and second images for display online to the product. This includes taking digital pictures of the product, for example. These images will be uploaded to the internal product database 360 or other internal site asset repository and will be associated with the product.

At 307, after the product information in the product setup form 326 has been filled out satisfactorily, the mobile product setup app 320 will build a product information payload and pass it to the internal product creation API 350. This internal product creation API 350 will be responsible for validating the information provided based on metadata of product attributes stored internally.

At 308, data is pushed to the internal product database 360. Internal product database 360 assesses and normalizes the data to determine if the product already exists. If a product already exists, the data will be merged with the existing product information based on a set of trained algorithmic rules. If no product exists, a new product item file will be generated and made available. This new product item file may further be enriched for transactability online and/or in-store.

Figure 4:
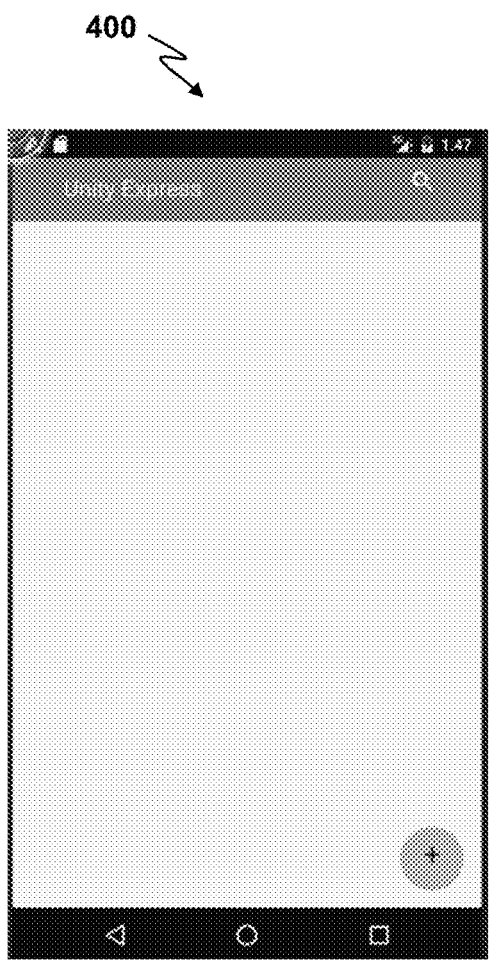
FIG. 4 is a screenshot of a user device interface for managing and updating an internal product catalog according to an embodiment.
Figure 5:
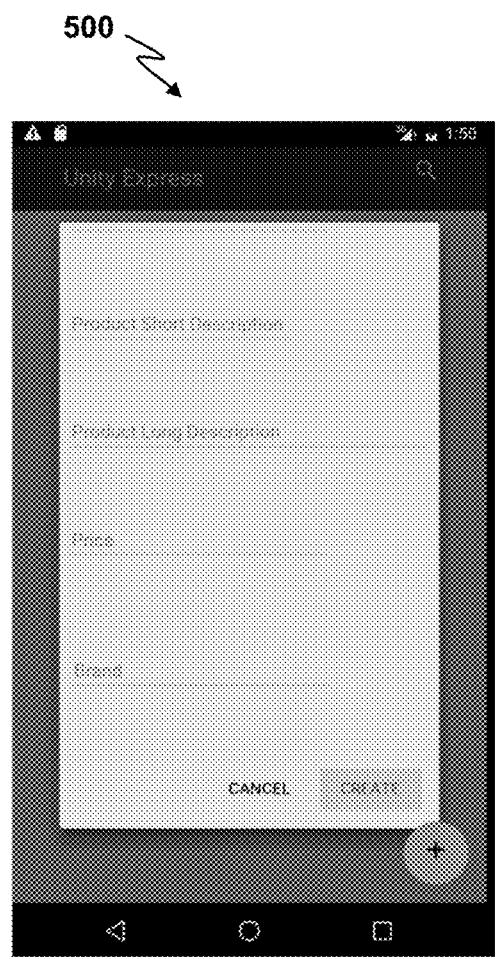
FIG. 5 is a screenshot of a blank product setup form for a user device interface according to an embodiment.
Figure 6:
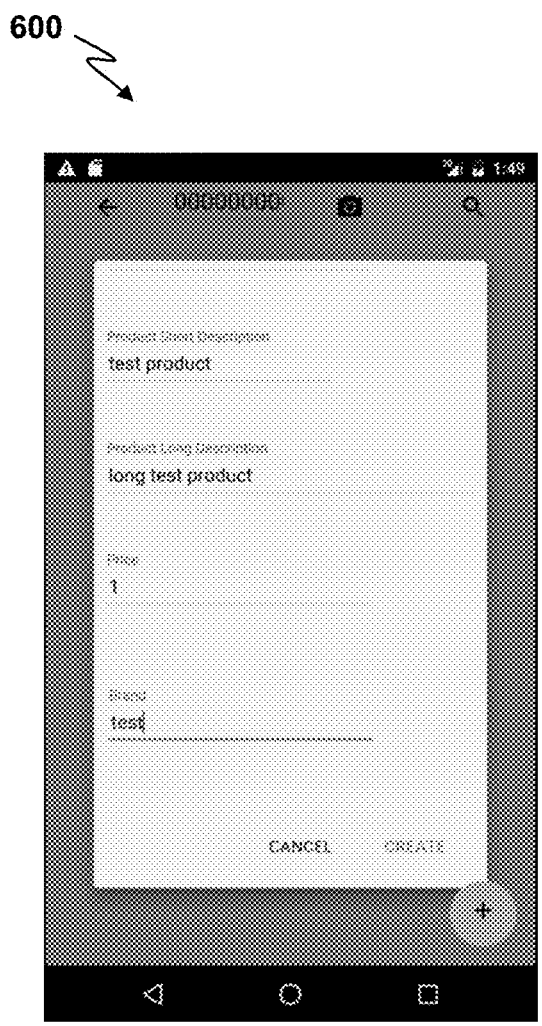
FIG. 6 is a screenshot of a data populated product setup form for a user device interface according to an embodiment.

FIGS. 4-6 show various screenshots of an interface of mobile device app. Referring to FIG. 4, an embodiment of a screenshot 400 of a user device interface for managing and updating an internal product catalog is shown. From this home screen, a user can start the searching or data entry process for express mobile product setup, as part of the search of step 210 or 301, for example.

Referring to FIG. 5, a screenshot 500 of a blank product create form for a user device interface is shown. The fields shown may be filled out to conduct a search of the product in internal or external product databases. The entry fields are not limited to those description, price and brand blanks and may include any number of desired product-related pieces of information. Entries may be filed in by a user, or pre-populated, depending upon the information available and use.

FIG. 6, for example, shows a screenshot 600 of a data populated product setup form for a user device interface. The screenshot 600 in FIG. 6 also contains a camera icon and image number, via which the pictures can be taken and uploaded in association with a new data entry file.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for managing and updating an internal product catalog comprising:
   an internal product catalog database comprising a plurality of existing item files, each existing item file associated with a product and comprising at least one attribute of the product;
   at least one external product catalog database comprising a plurality of external item files, each external item file associated with a product and comprising at least one attribute of the product; and
   an application program interface communicatively coupled with the internal product catalog database and the at least one external product catalog database and configured to:
   accept a user search request to search for a new product, the user search request comprising at least one attribute of the new product;
   facilitate a search of both the internal product catalog database and the at least one external product catalog database based on the user search request, the search of the at least one external product catalog database being facilitated when the product is not found from the internal product catalog database search, and
   if search results are found, present the search results and accept a selection of a search result to pre-populate a new item file, or
   if no search results are found, present a setup form for a new item file; and
   save the new item file as a draft new item file in the internal product catalog database in a draft state, wherein the draft state indicates that draft new item file is temporarily accessible as part of the internal product catalog database through a push to the internal product catalog database from a local network prior to subsequent approval to an approved state.

2. The system of claim 1, wherein the application program interface is configured to pre-populate the setup form with the at least one attribute of the new product of the user search request if no search results are found.

3. The system of claim 1, wherein the at least one attribute of the product and the at least one attribute of the new product are selected from the group consisting of: a Universal Product Code (UPC), a bar code, a Quick Response (QR) code, a radio frequency identification (RFID) identifier, a product title, a product number, a product brand, a product long description, a product department, a product dimension, a product keyword, a manufacturer suggested retail price (MSRP), a product cost, a product Uniform Resource Locator (URL), and a product image.

4. The system of claim 1, wherein the application program interface comprises a user interface configured to accept the user search request; present the search results and accept the selection of a search result to pre-populate the new item file; and present the setup form for a new item file.

5. The system of claim 1, wherein the at least one attribute of the new product provided in the user search request comprises an image of the new product, and wherein the application program interface is configured to use at least one image recognition technique to facilitate the search of both the internal product catalog database and the at least one external product catalog database using the image.

6. The system of claim 5, wherein the application program interface is communicatively coupled with a camera, and wherein the camera is the source of the image of the new product.

7. The system of claim 6, wherein the application program interface resides on a mobile electronic device that comprises the camera.

8. The system of claim 7, wherein the mobile electronic device comprises a smartphone, a tablet computing device, a laptop computing device, an augmented reality device, or a wearable electronic device.

9. The system of claim 1, wherein the application program interface is configured to accept data from a local item file for the new item file.

10. A method of managing and updating an internal product catalog comprising:
    accepting a user search request to search for a new product, the user search request comprising at least one attribute of the new product;
    searching both an internal product catalog database and at least one external product catalog database based on the user search request, the search of the at least one external product catalog database being facilitated when the product is not found from the internal product catalog database search;
    if at least one search result is found,
       presenting the at least one search result, and
       accepting a selection of one of the at least one search result to pre-populate a new item file;
    if no search results are found, presenting a setup form for a new item file; and
    saving the new item file as a draft new item file in the internal product catalog database in a draft state, wherein the draft state indicates that draft new item file is temporarily accessible as part of the internal product catalog database through a push to the internal product catalog database from a local network prior to subsequent approval to an approved state.

11. The method of claim 10, further comprising prepopulating the setup form with the at least one attribute of the new product of the user search request if no search results are found.

12. The method of claim 10, wherein the at least one attribute of the product and the at least one attribute of the new product are selected from the group consisting of: a Universal Product Code (UPC), a bar code, a Quick Response (QR) code, a radio frequency identification (RFID) identifier, a product title, a product number, a product brand, a product long description, a product department, a product dimension, a product keyword, a manufacturer suggested retail price (MSRP), a product cost, a product Uniform Resource Locator (URL), and a product image.

13. The method of claim 10, wherein the at least one attribute of the new product provided in the user search request comprises an image of the new product, and wherein the searching comprises using at least one image recognition technique to facilitate searching of both the internal product catalog database and the at least one external product catalog database using the image.

14. The method of claim 13, further comprising obtaining the image using a camera.

15. The method of claim 10, further comprising accepting data from a local item file for the new item file.

16. The method of claim 10, wherein accepting a user search request to search for a new product comprises accepting a bar code as the at least one attribute of the new product.

* * * * *